United States Patent [19]

Gerard et al.

[11] Patent Number: 5,929,167
[45] Date of Patent: Jul. 27, 1999

[54] PRESSURE SENSITIVE ADHESIVES COMPRISING THERMOPLASTIC POLYURETHANES

[75] Inventors: Eric-Jack Gerard; Xavier Muyldermans, both of Louvain-la-Neuve, Belgium

[73] Assignee: Shell Oil Company, Houston, Tex.

[21] Appl. No.: 09/002,903

[22] Filed: Jan. 5, 1998

[30] Foreign Application Priority Data

Jan. 6, 1997 [EP] European Pat. Off. .............. 97300033

[51] Int. Cl.$^6$ .............. C08J 3/00; C08K 3/20; C08L 75/00; C08F 8/30
[52] U.S. Cl. .......... 525/123; 524/270; 524/590; 524/499; 525/455
[58] Field of Search ............... 524/590, 270, 524/499; 525/123, 455

[56] References Cited

U.S. PATENT DOCUMENTS

| | | | |
|---|---|---|---|
| 3,427,366 | 2/1969 | Verdol et al. | 260/859 |
| 3,437,622 | 4/1969 | Dahl | 260/24 |
| 3,598,882 | 8/1971 | Brinkmann et al. | 260/873 |
| 3,895,149 | 7/1975 | Sheffler et al. | 428/94 |
| 4,053,446 | 10/1977 | Watabe et al. | 260/37 N |
| 4,107,256 | 8/1978 | Conrad et al. | 264/310 |
| 4,329,277 | 5/1982 | Murphy | 523/122 |
| 4,376,834 | 3/1983 | Goldwasser et al. | 521/159 |
| 4,532,316 | 7/1985 | Henn | 528/59 |
| 4,582,879 | 4/1986 | Frisch et al. | 525/424 |
| 4,722,946 | 2/1988 | Hostettler | 521/159 |
| 5,013,811 | 5/1991 | Ross | 528/60 |
| 5,167,899 | 12/1992 | Jezic | 264/510 |
| 5,486,570 | 1/1996 | St. Clair | 525/123 |

FOREIGN PATENT DOCUMENTS

| | | | |
|---|---|---|---|
| A-73299/87 | 1/1988 | Australia | C08G 18/64 |
| 0047081 A1 | 3/1982 | European Pat. Off. | C08G 18/69 |
| 0114185 | 8/1984 | European Pat. Off. | C08G 18/69 |
| 0380389 | 8/1990 | European Pat. Off. | C08G 18/65 |
| 0624612 A1 | 11/1994 | European Pat. Off. | C08G 18/62 |
| 0709416 A2 | 5/1996 | European Pat. Off. | C08G 18/62 |
| J87017845 | 4/1987 | Japan | C08L 9/00 |
| J88015294 | 4/1988 | Japan | C08G 18/69 |
| J01138220 | 5/1989 | Japan | C08G 18/69 |
| J90051950 | 9/1990 | Japan | C08G 18/69 |
| J03016702 | 1/1991 | Japan | B27K 3/15 |
| J91013269 | 2/1991 | Japan | C09D 3/72 |
| 94041580-B2 | 1/1994 | Japan | C09J 3/16 |
| 2279350 | 1/1995 | United Kingdom | C08F 8/30 |

OTHER PUBLICATIONS

*Handbook of Pressure Sensitive Adhesive Technology*, Second Edition, 1989, edited by Donatas Satas, pp. 522–523.

Y. Chamberlain et al., "Model Hard Segments from Diphenyl Methane Diisocyanate and Different Chain Extenders, and Corresponding Linear Block Polyurethanes," *Journal of Polymer Science: Polymer Chemistry Edition*, vol. 20, pp. 1445–1456 (1982).

L. Cuvé et al., "Synthesis and Properties of Polyurethanes Based on Polyolefine: 1. Rigid Polyurethanes and Amorphous Segmented Polyurethanes Prepared in Polar Solvents Under Homogeneous Conditions," *Polymer,* 1991, vol. 32, No. 2, pp. 343–352.

L. Cuvé et al., "Synthesis and Properties of Polyurethanes Based on Polyolefin: 2. Semicrystalline Segmented Polyurethanes Prepared Under Heterogeneous or Homogeneous Synthesis Conditions," *Polymer,* 1992, vol. 33, No. 18, pp. 3957–3967.

G. Boiteux et al., "Synthesis and Properties of Polyurethanes Based on Polyolefin: 3. Monitoring of Phase Separation by Dielectric Relaxation Spectroscopy of Segmented Semicrystalline Polyurethane Prepared in Bulk by the use of Emulsifiers," *Polymer,* 1994, vol. 35, No. 1, pp. 173–178.

S. Etienne et al., "Microstructure of Segmented Amorphous Polyurethanes: Small–Angle X–ray Scattering and Mechanical Spectroscopy Studies," *Polymer,* 1994, vol. 35, No. 13, pp. 2737–2743.

R. L. Zapp et al., "Isocyanate Reactions With Difunctional Polyisobutylenes," *Rubber Chemistry and Technology,* Jun. 1970, vol. 43, No. 4, pp. 1154–1187.

V. S. Chang et al., "Gas Permeability, Water Absorption, Hydrolytic Stability and Air–Oven Aging of Polyisobutylene–Based Polyurethane Networks," Polymer Bulletin 8, (1982) pp. 69–74.

R. R. Lagasse, "Domain Structure and Time–Dependent Properties of a Crosslinked Urethane Elastomer," *Journal of Applied Science,* vol. 21 (1977) pp. 2489–2503.

K. Ono et al., "Effects of Number–Average Molecular Weight of Liquid Hydroxyl–Terminated Polybutadiene on Physical Properties of the Elastomer," *Journal of Applied Science,* vol. 21, (1977) pp. 3223–3235.

C. M. Brunette, et al., "Structural and Mechanical Properties of Polybutadiene–Containing Polyurethanes," *Polymer Engineering and Science,* Feb. 1981, vol. 21, No. 3, pp. 163–171.

M. Xu et al., "Structure and Morphology of Segmented Polyurethanes: 1. Influence of Incompatability on Hard–Segmented Sequence Length," *Polymer,* 1983, vol. 24, Oct., pp. 1327–1332.

(List continued on next page.)

*Primary Examiner*—Patrick D. Niland
*Attorney, Agent, or Firm*—Donald F. Haas

[57] ABSTRACT

The present invention relates to a pressure sensitive adhesive composition comprising a thermoplastic polyurethane and a tackifying resin, which thermoplastic polyurethane is derived from an aromatic diisocyanate and/or a cycloaliphatic diisocyanate, a chain extender, and a polymeric diol and/or a hydrogenated polydiene diol and a hydrogenated polydiene mono-ol, and wherein the number average functionality of the diol and mono-ol ranges from 1.2 to 1.8. Further, the invention relates to a thermoplastic polyurethane for use in pressure sensitive adhesives and to articles containing the pressure sensitive adhesives.

11 Claims, No Drawings

OTHER PUBLICATIONS

C. H. Y. Chen et al., "Structure and Morphology of Segmented Polyurethanes: 2. Influence of Reactant Incompatibility," Polymer, 1983, vol. 24, Oct., pp. 1333–1340.

J. A. Verdol, et al., "Liquid Castable Elastomers From Hydroxyl–Terminated Polybutadienes. Par I–Hydropoxyl–Terminated Polybutadienes in One–Step Urethane Reactions," *Rubber Age,* Jul., 1966, pp. 57–64.

P.H. Eschger, "Poly Bd in Polyurethane Sealants," adesione Jan. 1992, pp. 7–9.

A. G. Makhmurov, et al. "Properties of Polydiene Urethane Block Copolymers and Their Dynamic Mechanical Properties," Obuv. Prom. (1971) 13(5), pp. 47–50. (Article plus English Abstract).

M. Zachcriesiewicz, "Urethanes a Base de Resines de Poly Bd pour Performances Electriques," Caoutchaucs et Plastics, No. 665, Dec. 1986, pp. 33–37.

A. G. Sinaiskii, et al., "Thermoplastic Polydiene Urethane Block Copolymers and Their Dynamic Mechanical Properties," Uretanouye Elastomery, (1972) pp. 132–138 (Article plus English Abstract).

V.P. Kaclzheva et al., "Preparation of Unsaturated Polyureyhane Rubbers by Using Hydroxylated Polydiene," Tr. Kazan Khim, Technol. Inst., No. 36, pp. 451–456 (1967).

International Search Report of Oct. 30, 1996 and May 22, 1998.

PRESSURE SENSITIVE ADHESIVES COMPRISING THERMOPLASTIC POLYURETHANES

FIELD OF THE INVENTION

The present invention relates to a pressure sensitive adhesive comprising a thermoplastic polyurethane and a tackifying resin. The present invention further relates to a thermoplastic polyurethane for use in a pressure sensitive adhesive. Moreover, the present invention relates to articles containing the pressure sensitive adhesive.

BACKGROUND OF THE INVENTION

Thermoplastic polyurethanes for use in adhesives are known in the art. According to the Handbook of Pressure Sensitive Adhesive Technology, 2nd ed., 1989, edited by Donatas Satas, page 523, polyurethanes have attracted a considerable amount of development effort for various types of pressure sensitive adhesives, but the applications so far have been limited to low tack, low peel adhesive protective liners.

Further, it is known from e.g. U.S. Pat. No. 3,437,622 that thermoset reaction products of polyols with aromatic polyisocyanates compounded with tackifying resins and plasticizers can be used for high-temperature-resistant masking tapes.

European patent application publication No. 0 709 416 describes pressure sensitive adhesives which contain thermoset polyurethanes. In one embodiment the polyurethanes are prepared from a polyisocyanate having a functionality of from 2.2 to 10 and a mixture of a hydrogenated polydiene mono-ol and a hydrogenated polydiene diol.

However, there is a need for thermoplastic pressure sensitive adhesives which can be used at high temperatures. Further, there is a need for a thermoplastic polyurethane-based pressure sensitive adhesives having better tack and cohesion properties, while exhibiting enhanced stability.

Surprisingly, thermoplastic polyurethane-based pressure sensitive adhesives have now been found which solve one or more problems encountered with known pressure sensitive adhesives. In particular, thermoplastic polyurethane-based pressure sensitive adhesives have been found which have better tack and cohesive properties and can be used up to high temperatures.

SUMMARY OF THE INVENTION

It has now been found possible to provide thermoplastic polyurethane-based pressure sensitive adhesives by using an aromatic diisocyanate, a chain extender and a certain mixture of a mono-ol and a diol in the preparation of thermoplastic polyurethane.

The present invention relates to a pressure sensitive adhesive composition, comprising a thermoplastic polyurethane and a tackifying resin, which thermoplastic polyurethane is derived from, that is the reaction product of, an aromatic diisocyanate and/or a cycloaliphatic diisocyanate, a chain extender and a polymeric diol and/or a hydrogenated polydiene diol and a hydrogenated polydiene mono-ol, and wherein the number average functionality of the diol and mono-ol ranges from 1.2 to 1.8. The present invention also relates to the thermoplastic polyurethane per se.

DETAILED DESCRIPTION OF THE INVENTION

In the present invention, if the number average functionality of the combined diol and mono-ol is less than 1.2, the cohesive properties of the pressure sensitive adhesive are too low. If the number average functionality of the combined diol and mono-ol is more than 1.8, the pressure sensitive adhesive is not tacky enough.

The number average functionality of the combined diol and mono-ol is determined by the following formula (I):

$$[F_{mono-ol} * \%\text{mole}_{mono-ol} + F_{diol} * \%\text{mole}_{diol}]/100 \qquad (I)$$

In this formula F stands for functionality of the mono-ol or diol and % mole stands for the mole percentage of the mono-ol or diol in the mixture. The functionality F is defined as the number of functional groups, that is hydroxy groups, per molecule. The functionality F can be determined by NMR or chemical titration techniques.

Preferably, the number average functionality of the combined diol and mono-ol ranges from 1.3 to 1.7. The desired tackiness and cohesion of the pressure sensitive adhesive can be influenced by selecting a number average functionality for the mixture within the above ranges.

According to one embodiment of the present invention, the number average functionality of the combined mono-ol and diol is less than 1.65, in particular less than 1.6. Pressure sensitive adhesives containing polyurethanes which have been prepared from inter alia such diol and mono-ol mixtures, have a much better tack than pressure sensitive adhesives containing polyurethanes prepared from similar diol and mono-ol mixtures having a higher number average functionality.

Typically, the functionality of the polydiene diol ranges from 1.85 to 2.0. The functionality of the polydiene mono-ol typically ranges from 0.85 to 1.15, preferably from 0.9 to 1.0.

The polydiene diol and the polydiene mono-ol preferably have a number average molecular weight in the range from 500 to 20000, more preferably in the range from 1000 to 10000.

The number average molecular weight is determined by Gel Permeation Chromatography (GPC) calibrated with polybutadiene standards having known number average molecular weights. The solvent for the GPC analyses is tetrahydrofuran.

The polymer backbone of the polydiene diol and mono-ol, that is the polydiene, is typically the hydrogenated polymerised product of conjugated diene monomers containing from 4 to 10 carbon atoms; preferably, from 4 to 6 carbon atoms; more preferably butadiene or isoprene, in particular butadiene. Preferably, hydrogenated polybutadiene diol or mono-ol is used having a 1,2-addition between 30% and 70% to minimise viscosity and subsequent crystallisation. More preferably, both the hydrogenated polybutadiene diol and mono-ol have a 1,2 addition within the said range.

It has now been found that especially thermoplastic polyurethanes prepared from mixtures containing the said hydrogenated polybutadiene diol and/or mono-ol, are very suitable for use in pressure sensitive adhesive compositions. In particular, the solution viscosity is remarkably low, which means that a solvent-based pressure sensitive adhesive may contain a very high thermoplastic polyurethane content. In addition, the melt viscosity is remarkably low, which means that the thermoplastic polyurethane allows preparation of an adhesive composition that can be mixed and easily coated as a solvent-free, hot melt pressure sensitive adhesive. Furthermore, as compared to thermoplastic polyurethanes containing polydiene blocks having a vinyl content above 70%, the adhesion to polyolefinic substrates is much better.

Therefore, according to a preferred embodiment, the present invention relates to a thermoplastic polyurethane and to pressure sensitive adhesive compositions containing the thermoplastic polyurethane which thermoplastic polyurethane is derived from an aromatic diisocyanate and/or a cycloaliphatic diisocyanate, a chain extender, and a mixture of a hydrogenated polybutadiene diol and a hydrogenated polybutadiene mono-ol, wherein the average functionality of the mixture ranges from 1.2 to 1.8, and wherein the 1,2 vinyl content in the polybutadiene mono-ol or diol is between 30% and 70%.

European patent specification No. 0 624 612 discloses the preparation of polyurethanes from an aromatic diisocyanate and a mixture of aliphatic polydiene doils, commercially available from Ken Saika Corp. and having the trade names POLYTAIL H and POLYTAIL HA. The functionality of the exemplified polydiene diols is believed to be 2.3 and 1.8 respectively. POLYTAIL H has a 1,2 vinyl content of about 20% and POLYTAIL HA has a 1,2 vinyl content of about 84%. According to this patent specification, the polyurethane product is biostable and very suitable for the preparation of medical articles.

Preferably, the 1,2 vinyl content in the polybutadiene mono-ol and diol is between 30% and 70%, more preferably, the 1,2 vinyl content in the polybutadiene mono-ol and diol is between 40% and 60%.

The polydiene diol and mono-ol used in this invention may be prepared anionically such as described in U.S. Pat. No. 5,376,745, U.S. Pat. No. 5,391,663, U.S. Pat. No. 5,393,843, U.S. Pat. No. 5,405,911 and U.S. Pat. No. 5,416,168, each incorporated herein by reference.

Polymerisation of the polydiene diol commences with a monolithium or dilithium initiator which builds a living polymer backbone at each lithium site. The anionic polymerisation is carried out in solution in an organic solvent, typically a hydrocarbon like hexane, cyclohexane or benzene, although polar solvents such as tetrahydrofuran can also be used. The molar ratio of initiator to monomer determines the molecular weight of the polymer.

If the conjugated diene is 1,3-butadiene and the resulting polymer is to be hydrogenated, the anionic polymerisation of butadiene in a hydrocarbon solvent like cyclohexane is typically controlled with structure modifiers such as diethylether or glyme (1,2-diethoxy-ethane) to obtain the desired amount of 1,2-addition. The optimum balance between low viscosity and high solubility in a hydrogenated polybutadiene polymer occurs at a 60/40 ratio of 1,4-butadiene/1,2-butadiene. This butadiene microstructure may e.g. be achieved during polymerisation at 50° C. in cyclohexane containing about 6% by volume of diethylether or about 1000 ppm of glyme.

Anionic polymerisation is terminated by addition of a functionalizing agent like those in U.S. Pat. No. 5,391,637, U.S. Pat. No. 5,393,843 and U.S. Pat. No. 5,418,296, but preferably the living polymer is capped with ethylene oxide, prior to termination. Thus, if a di-lithium initiator is used, each mole of living polymer is preferably capped with two moles of ethylene oxide and terminated with two moles of methanol to yield the desired polydiene diol.

The polydiene diol can also be made using a monolithium initiator which contains a hydroxyl group which has been blocked as the silyl ether (as in U.S. Pat. No. 5,376,745 and U.S. Pat. No. 5,416,168, each incorporated herein by reference). A suitable initiator is hydroxypropyllithium in which the hydroxyl group is blocked as the trimethylsilyl ether. This mono-lithium initiator can be used to polymerise butadiene in hydrocarbon or polar solvent. Each mole of living polymer is then capped with one mole of ethylene oxide and terminated with one mole of methanol to yield the mono-hydroxy polydiene polymer. The silyl ether is then removed by acid catalysed cleavage in the presence of water yielding the desired polydiene diol.

The polydiene mono-ol can be prepared in a way analogous to the preparation process of the polydiene diol. In the preparation of polydiene mono-ol a mono-lithium initiator is typically used, not containing any hydroxy groups as discussed above. The conjugated diene monomer is polymerised with the initiator to yield a living polymer. Preferably, each mole of living polymer is then capped with one mole of ethylene oxide and terminated with one mole of methanol.

The polydiene diol and mono-ol is preferably hydrogenated such that at least 90%, more preferably at least 95%, of the carbon to carbon double bonds in the diol or mono-ol is saturated. Hydrogenation of these polymers may be carried out by a variety of well established processes including hydrogenation in the presence of such catalysts as Raney Nickel, noble metals such as platinum and the like, soluble transition metal catalysts and titanium catalysts as in U.S. Pat. No. 5,039,755, incorporated herein by reference. A particularly preferred catalyst is a mixture of nickel 2-ethylhexanoate and triethylaluminum.

The polybutadiene polymer preferably has no less than about 30% 1,2-butadiene addition because, after hydrogenation, the polymer will be a waxy solid at room temperature if it contained less than about 30% 1,2-butadiene addition. To minimise viscosity of the diol or mono-ol, the 1,2-butadiene content is preferably between 40 and 60%.

If as conjugate diene for the preparation of the polydiene mono-ol or diol, isoprene is used, the isoprene polymers preferably have no less than 80% 1,4-isoprene addition in order to reduce Tg and viscosity. The diene microstructures are typically determined by $^{13}$C nuclear magnetic resonance (NMR) in chloroform.

The polydiene diols preferably have hydroxyl equivalent weights in the range of from 250 to 10,000, more preferably in the range of from 500 to 7,500. The polydiene mono-ols preferably have hydroxyl equivalent weights in the range of from 500 to 15,000, more preferably in the range of from 1,000 to 12,500.

The polymeric diol, or mixture of polymeric diols, is typically selected from those conventionally used for the preparation of thermoplastic polyurethanes. Such polymeric diols are typically polyester polyol, polyether polyol, hydroxy-terminated polycarbonates, and hydroxy-terminated copolymers of dialkyl siloxane such as dimethyl siloxane and alkylene oxides, such as ethylene oxide and propylene oxide.

Preferably, the polymeric diols have molecular weights (number average) within the range of 500 to 10,000, preferably 1,000 to 4,000.

Examples of suitable polyether polyols include polyoxyethylene glycols, polyoxypropylene glycols which, optionally, have been capped with ethylene oxide residues, random and block copolymers of ethylene oxide and propylene oxide; polytetramethylene glycol, random and block copolymers of tetrahydrofuran and ethylene oxide and/or propylene oxide. The preferred polyether polyols are random and block copolymers of ethylene and propylene oxide and polytetramethylene glycol polymers.

Examples of suitable polyester polyols include those which are prepared by polymerizing ε-caprolactone using an initiator such as ethylene glycol and ethanolamine, and those prepared by esterification of polycarboxylic acids such as phthalic, terephthalic, succinic, glutaric, adipic and azelaic acids with polyhydric alcohols such as ethylene glycol, butanediol and cyclohexane-dimethanol. A preferred polyester polyol is butanediol adipate.

Examples of suitable hydroxy-terminated polycarbonates include those prepared by reaction of diols containing 3–10 carbon atoms such as propane-1,3-diol, butane-1,4-diol, hexane-1,6-diol, 1,9-nonanediol, 2-methyloctane-1,8-diol, diethylene glycol, triethylene glycol and dipropylene glycol with diarylcarbonates such as diphenyl carbonate or with phosgene.

The functionality of the polymeric diol is typically in the range from 1.8 to 2.0, preferably from 1.85 to 2.0.

The amount of polymeric diol relative to the total amount of polymeric diol and hydrogenated polydiene diol may range from 0–100% by weight.

In other words, polymeric diol may partly or fully replace the hydrogenated polydiene diol in the thermoplastic polyurethane composition.

According to one preferred embodiment, the amount of polymeric diol relative to the total amount of diol is not more than 10% by weight; more preferably not more than 5% by weight; even more preferably, the polymeric diol is substantially absent (0% by weight).

According to another preferred embodiment, the amount of polymeric diol relative to the total amount of diol is more than 80% by weight; more preferably more than 90% by weight; even more preferably, the polymeric diol is substantially the only diol present (100% by weight).

A variety of aromatic diisocyanates and cycloaliphatic diisocyanates can be used to prepare the thermoplastic polyurethane. However, the diisocyanates must not be capable of forming a three dimensional network. Therefore, commercial grades of diisocyanates having an isocyanate functionality of greater than 2 should not be used. Preferably, the isocyanate functionality of the diisocyanate is in the range of from 1.8 to 2.0, more preferably in the range of from 1.9 to 2.0. Preferably, the aromatic diisocyanate is 4,4'-diphenylmethane diisocyanate (MDI) and/or an isomer thereof. Preferably, the cycloaliphatic diisocyanate is 4,4'-dicyclohexyl methane diisocynate and/or an isomer thereof.

The chain extender is typically a low molecular weight hydrocarbon containing two functional groups capable of reacting with the aromatic diisocyanate. In particular, the chain extender is an aliphatic or cycloaliphatic compound containing up to 15 carbon atoms and having two functional groups selected from hydroxy and amine groups. The number of carbon atoms present in the chain extender preferably ranges from 1 to 14, more preferably from 3 to 8. Preferably, the chain extender is a diol or a diamine, for example a diol selected from the group consisting of ethylene glycol, 1,2 propane diol, 1,6 hexane diol, 1,4 dihydroxycyclohexane and 1,4-butane diol, or a di-amine selected from ethylene diamine, 4,4'-methylene bis(o-chloro aniline), 4,4'-diamino diphenylmethane, p-phenylene diamine, and derivatives thereof.

The thermoplastic polyurethane may be prepared by a method known to those skilled in the art. According to one embodiment, the diisocyanate and the polymeric diol and/or the hydrogenated polydiene diol and the hydrogenated polydiene mono-ol are typically mixed and reacted to form an isocyanate-terminated prepolymer which is subsequently reacted with the chain extender. Alternatively, the diisocyante, the diol(s) mono-ol and chain extender are mixed and reacted to form the thermoplastic polyurethane by the so-called one-shot polymerisation method.

The respective amounts of diisocyanate and the diol and mono-ol are chosen such that there is no excess of either hydroxyl or isocyanate groups following reaction with the chain extender. The molar ratio NCO:OH is preferably 0.9–1.1, more preferably 1:1.

The chain extender is normally added in an amount of from 5 to 70 pbw per 100 pbw of aromatic diisocyanate, preferably from 10 to 50 pbw, more preferably from 20 to 30 pbw.

The thermoplastic polyurethane composition may typically be prepared by a solvent-less prepolymer method or a solvent/prepolymer method as described in more detail below.

In the solvent-less prepolymer method, the polydiene diol and/or polymeric diol and polydiene mono-ol are heated to a temperature typically in the range of from 70° C. to 100° C., and then thoroughly mixed with the desired amount of diisocyanate, typically for at least 2 hours, and, if desired, in an inert atmosphere such as under nitrogen flow. The desired amount of chain extender is added and thoroughly mixed before quickly degassing the mixture under vacuum. The mixture is then poured into a heated mould treated with a mould release compound. The polyurethane composition is formed by curing into the mould for several hours and then postcuring the product for a period of time at elevated temperature, typically for 0.5 to 24 hours at a temperature of at least 50° C., preferably at a temperature in the range from 60° C. to 150° C., for example above 110° C. for at least 2 hours or at 80° C. 7 hours. The thermoplastic polyurethane composition can then be processed further to prepare pressure sensitive adhesives.

In the solvent/prepolymer method, the polydiene diol and/or polymeric diol and polydiene mono-ol are dissolved in a solvent, preferably dry toluene, heated to a temperature typically in the range of from 70° C. to 100° C., and then thoroughly mixed with a diisocyanate, typically for at least 2 hours, and, if desired, in an inert atmosphere such as under nitrogen flow. The desired type and amount of chain extender is added and thoroughly mixed until the reaction is complete. The solvent is then evaporated from the mixture and the mixture is then postcured for a period of time at elevated temperature, typically for 0.5 to 24 hours at a temperature of at least 50° C., preferably at a temperature in the range of from 60° C. to 150° C., typically while under vacuum. The thermoplastic polyurethane composition can then be processed further to prepare pressure sensitive adhesives.

The pressure sensitive adhesive of the present invention comprises a thermoplastic polyurethane as described herein and a tackifying resin.

Tackifying (tackifier) resins are known to those skilled in the art and have for example been described in detail in the Handbook of Pressure Sensitive Adhesive Technology, referred to herein before, pages 527 to 544. Typically, the tackifying resin is selected from aliphatic oligomers derived from $C_2$–$C_{10}$ aliphatic mono-ene or diene monomers, preferably derived from $C_4$–$C_6$ aliphatic monomers, rosin esters, hydrogenated rosins, poly(terpene) resins, alpha-pinene resins, beta-pinene resins, hydrocarbon resins of petroleum origin, or phenolic resins. Preferably, the tackifying resin is compatible with the soft phase of the thermoplastic polyurethane, that is the part of the thermoplastic polyurethane molecule derived from the hydrogenated polydiene diol/mono-ol mixture. Hydrogenated hydrocarbon resins or aliphatic oligomers are particularly preferred. An example of a commercially available hydrogenated aliphatic oligomer resin is REGALITE R91 (REGALITE is a trademark), marketed by Hercules. Other suitable tackifying resins are REGALITE R101, R125 and S260, ESCOREZ 1310 and 5380 (ESCOREZ is a trademark), WINGTACK 95 (WINGTACK is a trademark), FORAL 85 and 105 (FORAL is a trademark), PICCOLYTE A115, S115, and S10 (PICCOLYTE is a trademark) and PICCOTAC 95E (PICCOTAC is a trademark).

The tackifying resin is typically present in the pressure sensitive adhesive composition in amounts up to 400 parts by weight (pbw) per 100 parts of thermoplastic polyurethane, preferably in an amount of from 10 to 300 pbw, more preferably from 50 to 200 pbw.

Typically, the pressure sensitive adhesive of the present invention further comprises a plasticizer. Plasticizers are known to those skilled in the art and have for example been described in detail in the Handbook of Pressure Sensitive Adhesive Technology, referred to herein before. Suitable plasticizers are those which are compatible with the tackifying resin and the diene blocks of the thermoplastic polyurethane. Examples of suitable plasticizers include mineral oils, animal or vegetable oils or low molecular weight liquid polyolefins, that is a weight average molecular weight of up to 5,000, preferably up to 2,000. Preferred plasticizers substantially do not contain olefinic unsaturation, that is at least 95% of the plasticizer is hydrogenated. Examples of suitable plasticizers include naphthenic oils marketed as SHELLFLEX 371 and 451, CATENEX 956 and TUFFLO 6204, paraffinic oils such as TUFFLO 6056, polybutylenes such as HYVIS 200, NAPVIS 30 and D-10, liquid resins such as REGALEZ 1018 and other oils such as ONDINA 68 and V-OIL 7047 (SHELLFLEX, CATENEX, TUFFLO, HYVIS, NAPVIS, REGALEZ, ONDINA, and V-OIL are trademarks). Primarily for economic reasons, especially preferred plasticizers are hydrogenated mineral oils.

The plasticizer, if present, is typically used in amounts of up to 150 pbw per 100 pbw of thermoplastic polyurethane, preferably of from 10 to 100 pbw, more preferably of from 25 to 75 pbw.

In addition to the tackifying resin and any plasticizer, other additives such as antioxidants, UV stabilisers, fillers, and flame retarders may be present, depending on the specific conditions under which the pressure sensitive adhesive composition is to be used. It belongs to the skill of the skilled person in this field to select any appropriate additional additives and the desired amount to be added to the pressure sensitive adhesive composition of this invention.

According to a third aspect, the present invention relates to articles containing the pressure sensitive adhesive as described herein. The pressure sensitive adhesive of the present invention is particularly suitable for use in diapers etc. and for those applications requiring hydrophobic, high stability adhesives, such as in certain automotive applications.

The invention will now be further illustrated by means of the following Examples which are included for illustrative purposes only and are in no way meant to limit the present invention.

EXAMPLES

Example 1

A thermoplastic polyurethane was prepared by the solvent-less prepolymer method described herein before. A mixture was prepared of KRATON Liquid Polymer L-2203 hydrogenated polydiene diol, having a functionality of 1.92 and a hydroxyl equivalent weight of 1720, and 29.3% by weight of KRATON Liquid Polymer L-1203 hydrogenated polydiene mono-ol, having a functionality of 0.95 and a hydroxyl equivalent weight of 4200. The number average functionality of the mixture was 1.67. KRATRON is a trademark and KRATON Liquid Polymer is commercially available from Shell Chemical companies.

The mixture was heated to 85° C. and mixed for 2 hours with commercially available 4,4'-diphenylmethane diisocyanate (MDI) having a functionality of 1.95. The molar ratio NCO:OH was calculated to be 1:1. Unlike conventional thermoplastic polyurethane manufacture, it was not necessary to carry out this step in an inert (water-free) atmosphere. Without wishing to be bound by a particular theory, it would appear that the hydrophobicity of the hydrogenated polydiene diol and mono-ol mixture makes this requirement superfluous.

Subsequently, 25 pbw of 1,4 butane diol chain extender per 100 pbw of aromatic diisocyanate was added and thoroughly mixed. The mixture thus obtained was degassed under vacuum and poured into a heated mould treated with a mould release compound. The polyurethane composition was formed by curing and postcuring at 80° C. for 7 hours in total. The thermoplastic polyurethane (TPU) thus formed had a hard phase of 19.34%.

A pressure sensitive adhesive formulation was prepared by dissolving in toluene 100 pbw TPU, 100 pbw tackifying resin REGALITE R91, commercially available from Hercules and 50 pbw plasticizer ONDINA N68, commercially available from Shell companies.

The pressure sensitive adhesive was coated on a polyester backing. The thickness of the coating was approximately 22 μm.

Adhesive properties were determined by a number of tests, results of which have been reported in Table 1.

Example 2

The experiment described in Example 1 was repeated, but the polydiene diol/mono-ol mixture contained 48.6% by weight of KRATON Liquid L-1203 hydrogenated polydiene mono-ol. The number average functionality of the mixture was 1.49. The amount of aromatic diisocyanate was adapted to maintain a NCO:OH molar ratio of 1: 1, and the amount of chain extender remained the same relative to the amount of aromatic diisocyanate. The thermoplastic polyurethane (TPU) thus formed had a hard phase of 17.31%.

A pressure sensitive adhesive was formulated and coated in the same way as described in Example 1. Adhesive properties were determined by a number of tests, results of which have been reported in Table 1.

Comparative Example 3

The experiment described in Example 1 was repeated, but using polydiene diol only, having a functionality of 1.92. The amount of aromatic diisocyanate was adapted to maintain a NCO:OH molar ratio of 1:1, and the amount of chain extender remained the same relative to the amount of aromatic diisocyanate. The thermoplastic polyurethane (TPU) thus formed had a hard phase of 22%.

A pressure sensitive adhesive was formulated and coated in the same way as described in Example 1. Adhesive properties were determined by a number of tests, results of which have been reported in Table 1.

Comparative Example 4

A pressure sensitive adhesive was formulated and coated in the same way as described in Example 1, but instead of the thermoplastic polyurethane a hydrogenated poly (styrene) - poly(butadiene) - poly(styrene) block copolymer (SEBS) was used, having a diblock content of 35% and a total styrene content of 13% by weight. The SEBS is commercially available from Shell Chemical companies under the trademark KRATON G 1657. Adhesive properties were determined by a number of tests, results of which have been reported in Table 1.

TABLE 1

|  | Example 1 | Example 2 | Example 3* | Example 4* |
|---|---|---|---|---|
| Rolling ball tack | 26 cm | 13 cm | >30 cm | 5 cm |
| Loop tack st. steel | 1.84 | 7.7 | 0.6 | 3.5 |
| Looptack polyprop. | 1.0 | 2.4 | 0.3 | 2.4 |
| Looptack polyethyl. | 1.45 | 2.3 | 0.4 | 1.8 |
| Peel adh. Metal | 7.0 | 12.7(1) | 4.4 | 4.5 |

* = Comparative
(1) = Cohesive failure
Loop tack test results and peel adhesion test results have been expressed in N/25 mm

What is claimed is:

1. A pressure sensitive adhesive composition consisting essentially of a thermoplastic polyurethane and a tackifying resin, which thermoplastic polyurethane is derived from an aromatic diisocyanate and/or a cycloaliphatic diisocyanate; a chain extender; and a polymeric diol and/or a hydrogenated polydiene diol and a hydrogenated polydiene mono-ol, and wherein the number average functionality of the diol and mono-ol ranges from 1.2 to 1.8.

2. The pressure sensitive adhesive of claim 1 wherein the number average functionality of the diol and mono-ol and ranges from 1.3 to 1.7.

3. The pressure sensitive adhesive of claim 1 wherein the thermoplastic polyurethane is derived from an aromatic and/or a cycloaliphatic diisocyanate; a chain extender; and a polymeric diol and a hydrogenated polydiene mono-ol.

4. The pressure sensitive adhesive of claim 2 wherein the thermoplastic polyurethane is derived from an aromatic and/or a cycloaliphatic diisocyanate; a chain extender; and a polymeric diol and a hydrogenated polydiene mono-ol.

5. The pressure sensitive adhesive of claim 1 wherein the thermoplastic polyurethane is derived from an aromatic and/or a cycloaliphatic diisocyanate; a chain extender; and a hydrogenated polydiene diol and a hydrogenated polydiene mono-ol.

6. The pressure sensitive adhesive of claim 2 wherein the thermoplastic polyurethane is derived from an aromatic and/or a cycloaliphatic diisocyanate; a chain extender; and a hydrogenated polydiene diol and a hydrogenated polydiene mono-ol.

7. The pressure sensitive adhesive of claim 2 wherein the polydiene diol is a hydrogenated polybutadiene diol.

8. The pressure sensitive adhesive of claim 2 wherein the polydiene mono-ol is a hydrogenated polybutadiene mono-ol.

9. The pressure sensitive adhesive of claim 1 further comprising a plasticizer.

10. A thermoplastic polyurethane consisting essentially of an aromatic diisocyanate and/or a cycloaliphatic diisocyanate; a chain extender; and a polymeric diol and/or a hydrogenated polydiene diol and a hydrogenated polydiene mono-ol, wherein the number average functionality of the diol and mono-ol ranges from 1.2 to 1.8.

11. The thermoplastic polyurethane of claim 10 wherein the thermoplastic polyurethane is derived from an aromatic diisocynate and/or a cycloaliphatic diisocyanate; a chain extender; and a hydrogenated polybutadiene diol and a hydrogenated polybutadiene mono-ol, and wherein the 1,2-vinyl content in the polybutadiene mono-ol or diol is between 30 and 70%.

* * * * *